United States Patent Office 3,200,702
Patented Aug. 17, 1965

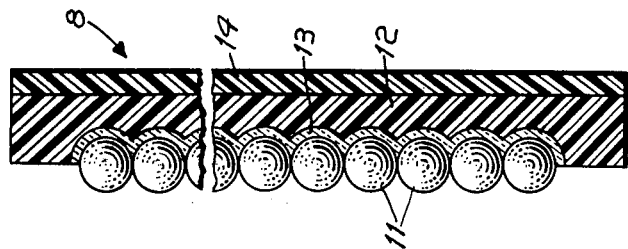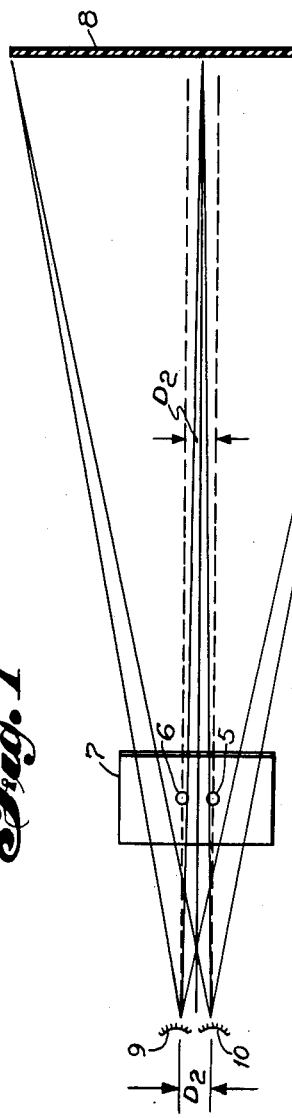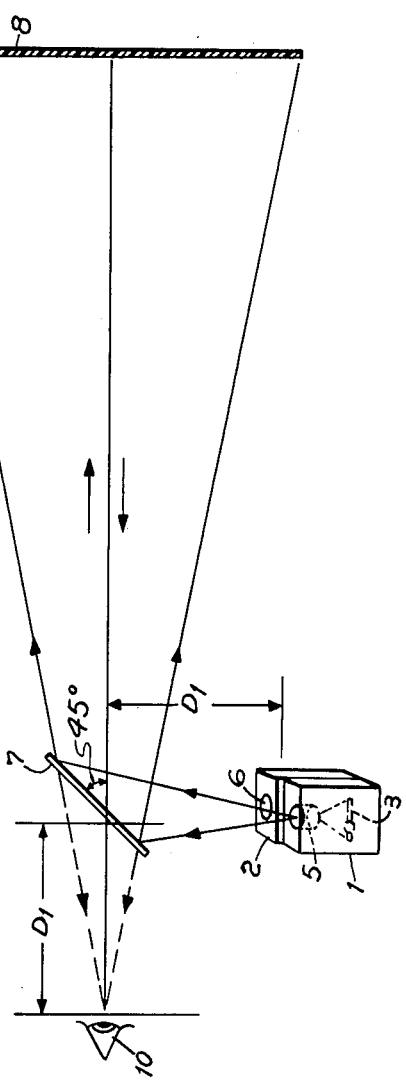

3,200,702
STEREOSCOPIC PROJECTION APPARATUS
Ames F. Giordano, Newark, N.J., assignor to International Telephone and Telegraph Corporation, Nutley, N.J., a corporation of Maryland
Filed Aug. 15, 1962, Ser. No. 217,190
1 Claim. (Cl. 88—24)

This invention relates to stereoscopic projection apparatus and more particularly to novel apparatus providing an improved three dimensional viewing effect without requiring the utilization of special optical devices or aids.

Many of the prior art stereoscopic viewing systems have required the observer to wear or use special visual aids, such as glasses. Most of these systems have been of two general types; color image separation and polarization image separation. The viewing of color separated stereoscopic displays necessitates employment of glasses or goggles having different colored eye pieces. This imposes a limitation on the displayed information as to the number of colors that can be utilized at any one time. In addition, no intermediate color combinations can be observed.

Likewise, the polarized image separation scheme requires the observer to wear special polarized glasses to perceive the display. A basic drawback of this particular scheme is that the observer's viewing of normal scenes is greatly impaired. For example, if the observer is a trainee in a flight simulator, the use of polarized glasses would cause difficulty in observing the instruments and controls. The special glasses cause a great loss of light because of the density of the polarized lenses. This also leads to excessive eye fatigue.

Therefore, it is an object of the present invention to provide a stereoscopic viewing apparatus which produces large images with high brightness and does not require the observer to wear any special viewing aids.

It is a further object of the present invention to provide a stereoscopic projection and viewing system in which images may be projected in full color.

It is a feature of the present invention to focus two stereoscopic images of an object upon a beam splitter. The beam splitter in turn projects the two stereoscopic images upon a special highly directive viewing screen. The highly directive screen has the property of reflecting an image back along the exact same path in which the image was projected onto the screen. The two images reflected from the directive screen are returned through the beam splitter to an observation point where an observer may see a stereoscopic presentation of the two projected images.

The above-mentioned and other features and objects of the invention will become more apparent by reference to the following description taken in conjunction with the accompanying drawings in which:

FIG. 1 is a plan view of the projection apparatus of the invention;

FIG. 2 is a slide elevation view of the projection apparatus of the invention; and FIG. 3 is a fragmentary cross-sectional view illustrating the nature of the surface of the special optical viewing screen of FIGS. 1 and 2.

Referring to FIGS. 1 and 2 together, are shown two image projectors 1 and 2. Each projector contains a stereoscopic image which is to be projected. The stereoscopic image to be projected by projector 1 is shown at 3. Projector 2 likewise projects a stereoscopic image (not shown) of the same object. According to conventional technique, two pictures of the same object are taken originally from camera positions displaced from each other to create the illusion of depth, which is the desired result of the stereoscopic image projection. Projectors 1 and 2 may also contain suitable lenses and sources of illumination. Only objective lenses at 5 and 6 have been shown.

FIG. 2 shows the projection of the image 3 by objective lens 5 of projector 1 onto beam splitter 7. Projector 2 likewise simultaneously projects a separate distinct stereoscopic image of the same object onto beam splitter 7, FIG. 2 showing only the path of the image projected by projector 1 for the sake of simplicity. Beam splitter 7 comprises a partially silvered mirror which both reflects and transmits images incident thereon. Beam splitter 7 is disposed at a 45 degree angle with respect to the parallel axes of objective lenses 5 and 6 as indicated.

Located some distance away from beam splitter 7 is a unique directive optical screen 8 having a special lenticular type coating. Optical screen 8 has the property that any image projected upon it is reflected and returned along exactly the same path from which the image originated. This is true no matter what the direction of the incident light is. Screen 8 is thus extremely directional in nature. For example, if a spot of light from a flashlight is directed upon screen 8, a person holding the flashlight and standing directly behind the flashlight can observe a spot of illumination upon the screen. However, another observer located only a small distance from the first observer will not be able to observe any illumination whatsoever, so directional is the screen. The surface of screen 8 is composed of a very large number of minute spherical members 11, each forming a tiny spherical reflecting prism or lens, as indicated on a greatly enlarged scale in FIG. 3. A single layer of closely spaced uniform glass spheres is set in a specular or reflective layer 12. The spheres have diameters in the order of thousandths of an inch, such that there will be no deterioration of the resolution of fine quality film. A low index of refraction resin binder 13 provides spacing for proper lens action and the specular layer 12 is attached to a suitable backing 14. The operation of the spheres is known in the art and screen 8 does not in itself form the novelty of the present invention.

The eyes 9 and 10 of an observer viewing the screen 8 are disposed in a plane parallel to the axes of projectors 1 and 2, as shown, but the screen 8 need not be exactly parallel to the axes of projectors 1 and 2 for operation and also can be curved, if properly designed. By use of additional mirrors, the projector can be positioned at other locations with respect to the observer. The images may then require inversion for proper correlation by the eyes. The observer is located the same distance D1 behind beam splitter 7 as the objective lenses of projectors 1 and 2 are located below beam splitter 7. The observer's position at 9 and 10 represents the two focal points for the two images reflected from screen 8. In operation, projector 1 by means of the objective lens 5 projects a first stereoscopic image which is partially reflected by beam splitter 7 and is incident upon screen 8. This image is reflected from screen 8 in a highly directive manner through beam splitter 7 towards point 10 at which is located the right eye of the observer. Thus, the right eye of the observer sees the first stereoscopic image from projector 1. The point 10 represents a focal point for projector 1 created by the co-operation of beam splitter 7 and directive screen 8. In the same manner, projector 2 by means of objective lens 6 projects a second stereoscopic image of the same object on beam splitter 7 which is reflected onto directive screen 8. Directive screen 8 again reflects the second stereoscopic image in a highly directive manner back towards point 9 where is located the left eye of the observer. Point 9 is the focal point for projector 2.

Projectors 1 and 2 are preferably placed apart at a horizontal distance D2 equal to the interocular spacing or normal separation between an observer's eyes. The distance D2 would normally be approximately two and one-half inches. Thus, the observer's right eye at 10 observes a first stereoscopic image projected by projector 1 while the observer's left eye at 9 observes a second stereoscopic image of the same scene projected by projector 2 to create a stereoscopic view. The stereoscopic images projected by projectors 1 and 2 may be black and white or any combination of colors since the system does not depend on color separation. Likewise, the observer has no need to wear special goggles or other equipment but need merely stand at the location indicated to observe the stereoscopic projection.

The images to be projected may be taken from any suitable source such as still photographs, stereo film, television cameras with a stereo attachment, a pair of small cathode ray tubes with projection apparatus, or a scale model such as utilized in conjunction with the display system more fully described in a copending application filed Aug. 28, 1962, Serial No. 219,924, entitled "Three Dimensional-to-Planar Projection Display," by the instant inventor and assigned to the same assignee. In the latter case, two intermediate viewing lenses would provide stereo images of the model.

While there has been described above principles of the invention in connection with specific apparatus, it is to be clearly understood that this description is made only by way of example and not as a limitation to the scope of this invention as set forth in the objects thereof and in the accompanying claim.

What is claimed is:

Stereoscopic projection apparatus comprising:

first means projecting a first stereoscope image of an object;

second means projecting a second stereoscopic image of said object spaced from said first projecting means an interocular distance;

a beam splitter disposed at substantially a 45 degree angle with respect to a plane defined by the axes of said first and second projecting means to reflect said first and second images; and a directive viewing screen disposed on one side of said beam splitter and substantially parallel to the axis of each of said projecting means in a cooperative relationship with said beam splitter to produce a focal point for each of said first and second images spaced at said interocular distance at a given location on the other side of said beam splitter, said given location being disposed at a distance from said beam splitter equal to the distance between said first and second projecting means and said beam splitter.

References Cited by the Examiner

UNITED STATES PATENTS 2,727,427   12/55   Jenkins _____ 352—89
2,889,739   6/59   Moore _____ 88—1

JULIA E. COINER, *Primary Examiner.*
NORTON ANSHER, *Examiner.*